July 8, 1969  M. MORSE  3,453,851
MEANS FOR MAKING SPIRAL LOCKING SCREWS HAVING
COAXIALLY ALIGNED ENDS
Filed June 27, 1967
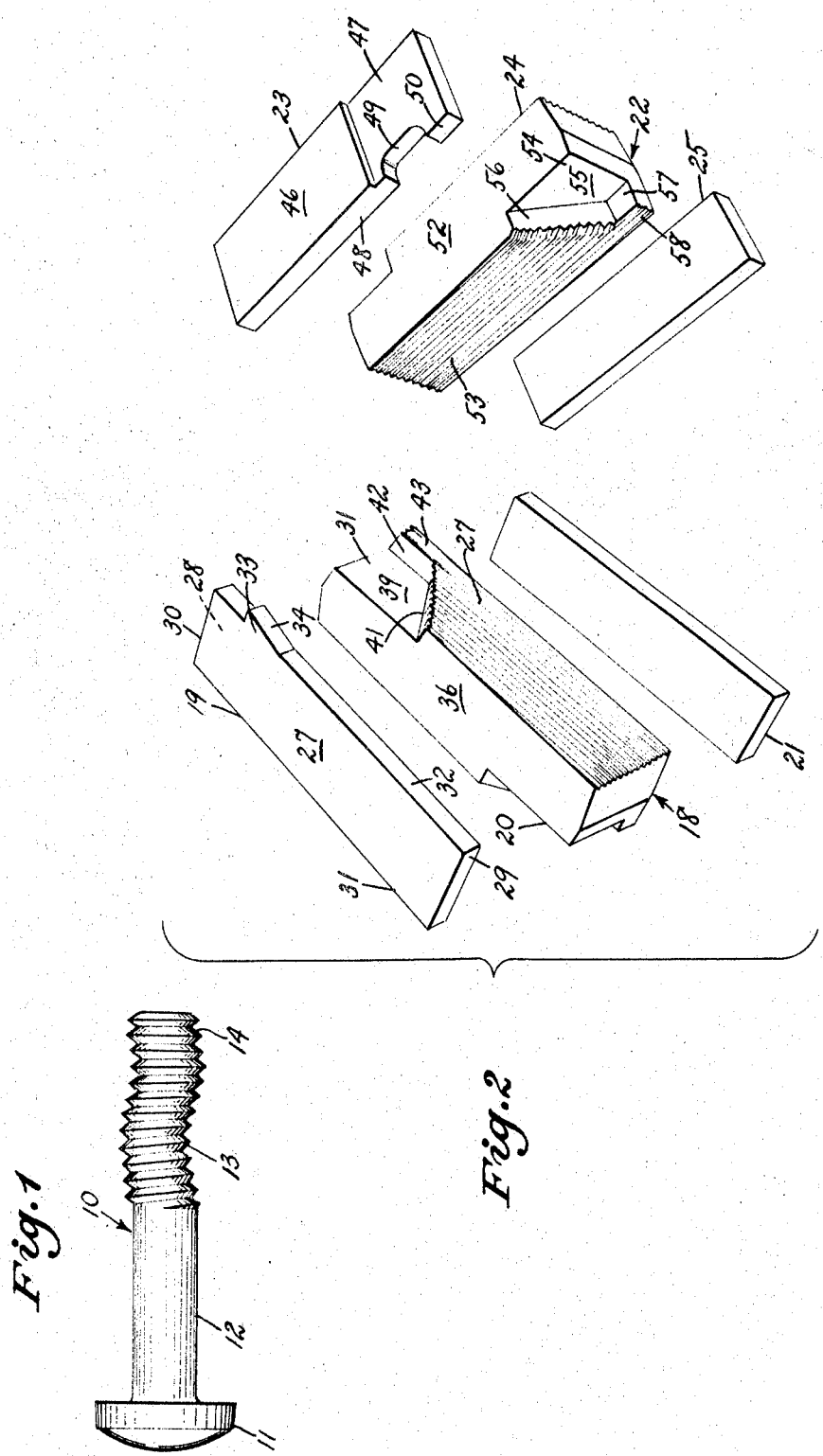

United States Patent Office 3,453,851
Patented July 8, 1969

3,453,851
MEANS FOR MAKING SPIRAL LOCKING SCREWS HAVING COAXIALLY ALIGNED ENDS
Milton Morse, Fort Lee, N.J., assignors to A.P.M. Hexseal Corporation, Englewood, N.J., a corporation of New Jersey
Filed June 27, 1967, Ser. No. 649,288
Int. Cl. B21b 17/04; B21h 3/06; B21d 17/00
U.S. Cl. 72—90
3 Claims

ABSTRACT OF THE DISCLOSURE

Means including a pair of relatively translationally movable die members, each having thread forming surfaces having alignable recesses therein, cam means associated with one of said die members, adjacent said recess, and corresponding relief means adjacent another of said recesses, said die means imparting a shape to a screw which is deviated from its normal axis, said cam means serving to align one end of a screw adjacent the head thereof with the opposed threaded end thereof to facilitate installation.

---

This invention relates generally to the field of manufacturing locking screws of threaded type in which the threaded shank has been deviated from normal coaxial alignment. Reference is made to my copending applications Ser. Nos. 589,479 and 586,295, which disclose screws of the instant type, together with a means for the manufacture thereof.

It has been found that a suitable locking action can be obtained by so manufacturing the screw to include a relatively short length which is threaded and deviated, the remaining portion of the shank, in the case of longer screws being coaxially aligned and free of thread. However, to facilitate engagement of such threads, it is necessary that their be a free threaded end which serves as a lead whereby engagement with a corresponding nut is facilitated, the lead being coaxially aligned with the opposite end of the screw which receives a driving force.

It is among the principal objects of the present invention to provide improved die means for facilitating the manufacture of the above described preferred form of locking screw.

Another object of the invention lies in the provision of a means for manufacturing locking screws of the above described type, in which the alignment is obtained substantially at the conclusion of the threading operation.

A further object of the invention lies in the provision of an improved means of the class described which may be employed using conventional existing roll threading machinery, with relatively little adaptation.

These objects, as well as other incidental ends and advantages, will more fully appear in the progress of the following disclosure, and be pointed out in the appended claims.

In the drawing, to which reference will be made in the specification;

FIGURE 1 is a view in elevation showing a spiral locking screw made in accordance with the disclosed invention.

FIGURE 2 is an exploded view in perspective showing the means for producing the screw illustrated in FIGURE 1.

In accordanec with the invention, the locking screw illustrated in FIGURE 1, and generally indicated by reference character 10 comprises broadly; a head portion 11, an unthreaded shank portion 12, a threaded spiral section 13, and a threaded lead section 14. As distinguished from prior art screws of similar type, as for example that disclosed in my above-mentioned copending applications Ser. Nos. 586,295 and 589,479, the screw 10 is only partially threaded and deviated, to leave a substantial portion of unthreaded shank which is generally coaxially aligned with respect to the principal axis of the screw. The lead section 14, may include two to three threads, and is coaxially aligned with respect to the shank 12, whereby the same may be conveniently engaged with a nut (not shown) to provide a locking action therewith. In the course of manufacturing a screw 10 in accordance with the disclosures of the mentioned copending applications, it is difficult to arrive at a completed screw in which the lead section is accurately aligned with the principal axis of the screw, owing principally to the shape of the cooperating die elements.

Referring to FIGURE 2, there is illustrated die elements which will produce the desired result, including a moving die element 18, and a relatively stationary die element 22. The element 18 includes a cam plate 19, a moving die member 20 and one or more spacer plates 21. The stationary die element 22 includes a relief plate 23 the stationary die member 24 and a corresponding spacer plate 25.

Referring to the moving die element 18, the cam plate 19 is generally rectangular in configuration, being bounded by upper and lower planar surfaces, the upper one of which is indicated by reference character 27. The surfaces 27 and 28 communicate with end edges 29 and 30, an outer side edge 31, and an inner side edge 32 which mounts a cam portion 33 having an inclined cam face 34.

The moving die member 20 includes an upper surface 36 engageable with the cam plate 19, and a thread-forming inner surface 27, the trailing edge of which is modified to form a relief recess 31 of generally trapezoidal configuration. The recess 31 is bounded by an inner wall 39, a sloped end wall 41, and a bottom wall 42 overlying a threaded forming portion 43, adapted during use to engage the lead section 14 of the screw 10.

The relief plate 23 is of corresponding configuration, including an upper surface 46 having a stepped area 47 defining an inner edge surface 48. The surface 48 is provided with a relief notch 49 accommodating the cam 34, and a realigning section 50 positioned immediately adjacent the notch 49 and coplanar with the side edge 51.

The stationary die member 24 includes an upper surface 52 engaging the relief plate 23, and an inner thread forming surface 53 defining a corresponding relief recess 54 at the trailing end thereof. The recess 54 is also trapezoidal in configuration, being bounded by an inner wall 55, and end wall 56, and a bottom wall 57 overlying a threaded portion 58 corresponding to the portion 43.

During operation, the screw is rolled between the die elements in well known manner to impart the sections 13 and 14. This action will usually move the unthreaded shank 12 out of coaxial alignment, and upon reaching the cam portion 33, irrespective of its misalignment, it will be cammed into the relief notch 49, to be subsequently struck by the realigning portion 50 which brings it into coaxial alignment with the lead section 14. During this operation, the spiral section 13 is disengaged, contact being made only with the lead section 14 by the portions 43 and 58.

If longer screws are to be made, additional spacers (not shown) may be placed over the relief plate and cam plate, and at the same time, the bottom spacer plates 21 and 25 would be substituted by thinner ones, so that the total overall height of each assembly will properly fill the pockets of the thread rolling machine (not shown). As seen in FIGURE 2, the spacer plates are slightly transversely narrower than the dies, so that they at no time may contact with the screw itself.

I wish it to be understood that I do not consider the invention limited to the precise details of structure shown and set forth in this specification, for obvious modifications will occur to those skilled in the art to which the invention pertains.

I claim:

1. In a moving die means for making a threaded screw having a head and a shank portion deviated from its normal longitudinal axis, the improvement comprising: first and second cooperative die means, each having thread forming surfaces, there being recessed areas in each of said thread forming surfaces adapted to be selectively disposed opposite each other, said recesses extending less than the entire transverse width of said thread forming surfaces, cam means disposed adjacent one of said recessed areas, and correspondingly positioned relief means positioned adjacent the other of said recessed areas; and realigning means positioned in coplanar adjacent relation relative to said relief means; whereby upon relative translational movement between said first and second die means to form said screw, the threaded end of said screw may be engaged therebetween in areas below said recessed areas, and the head end thereof may be axially aligned with said thread end by the coaction of said cam means, relief means and realigning means.

2. Structure in accordance with claim 1, said relief means including a notch, said realigning means including a camming surface adjacent said notch.

3. Structure in accordance with claim 2, said cam means being on a second separate plate overlying the other of said die means.

References Cited

UNITED STATES PATENTS

| | | | |
|---|---|---|---|
| 2,284,659 | 6/1942 | Hosking | 72—88 |
| 2,352,540 | 6/1944 | Hanneman | 72—88 X |
| 3,308,645 | 3/1967 | Hampton | 72—88 X |
| 3,339,389 | 9/1967 | Moscow | 72—88 |

MILTON S. MEHR, *Primary Examiner.*

U.S. Cl. X.R.

10—10; 72—88, 469